US012808757B2

(12) United States Patent
Mutairi et al.

(10) Patent No.: US 12,808,757 B2
(45) Date of Patent: Nov. 24, 2026

(54) PROTECTIVE CASE FOR GAS SAMPLING CYLINDER

(71) Applicant: SAUDI ARABIAN OIL COMPANY, Dhahran (SA)

(72) Inventors: Sattam S. Mutairi, Dhahran (SA); Abdullah M. Alhajri, Dhahran (SA); Salman M. Qathami, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 365 days.

(21) Appl. No.: 18/666,326

(22) Filed: May 16, 2024

(65) Prior Publication Data

US 2025/0354900 A1 Nov. 20, 2025

(51) Int. Cl.

*G01N 1/22* (2006.01)
*F17C 5/00* (2006.01)
*G01N 1/24* (2006.01)

(52) U.S. Cl.

CPC ............ *G01N 1/2226* (2013.01); *F17C 5/00* (2013.01); *G01N 1/24* (2013.01);
(Continued)

(58) Field of Classification Search

CPC .................. G01N 1/2226; G01N 1/24; G01N 2001/2238; F17C 5/00; F17C 2201/0109;
(Continued)

(56) References Cited

U.S. PATENT DOCUMENTS 4,389,372 A 6/1983 Lalin
4,967,923 A 11/1990 Wren
(Continued)

FOREIGN PATENT DOCUMENTS

CN 201599560 U 10/2010
CN 112727815 A * 4/2021 ............. F17C 13/00
(Continued)

OTHER PUBLICATIONS

"Formed Sampling Cylinders and Accessories," Hoke, https://hoke.com/wp-content/uploads/2020/05/79008_FormedSamplingCylinders_Catalog.pdf, accessed Aug. 16, 2024, 20 pages.
(Continued)

*Primary Examiner* — Jamel E Williams
(74) *Attorney, Agent, or Firm* — Vorys, Sater, Seymour and Pease LLP

(57) ABSTRACT

A protective case for a gas sampling cylinder includes a body extending along an axis and having a first open end and a second open end opposite the first open end. The body includes a base portion and a lid portion pivotably attached to the base portion. The protective case also includes a first end cap removably provided over the first open end, wherein the first end of the gas sampling cylinder extends through the first open end and is accessible upon removal of the first end, and a second end cap removably provided over the second open end, wherein the second end of the gas sampling cylinder extends through the second open end and is accessible upon removal of the second end. The protective case further includes an extendable and retractable stand connected to the base portion, the extendable and retractable stand having a retracted configuration and an extended configuration.

20 Claims, 3 Drawing Sheets

(52) U.S. Cl.
CPC ........................... *F17C 2201/0109* (2013.01); *F17C 2203/066* (2013.01); *F17C 2205/018* (2013.01); *F17C 2205/0311* (2013.01); *F17C 2205/0332* (2013.01); *F17C 2270/05* (2013.01); *G01N 2001/2238* (2013.01)

(58) Field of Classification Search
CPC .......... F17C 2203/066; F17C 2205/018; F17C 2205/0311; F17C 2205/0332; F17C 2270/05
See application file for complete search history.

(56) References Cited

U.S. PATENT DOCUMENTS

| | | | | |
|---|---|---|---|---|
| 5,845,809 | A | | 12/1998 | Garrett et al. |
| 6,092,519 | A | | 7/2000 | Fish et al. |
| 11,016,067 | B2 | | 5/2021 | Knight et al. |
| 2018/0202902 | A1 | * | 7/2018 | Hoffarth .............. G01N 1/2214 |

FOREIGN PATENT DOCUMENTS

| | | | | | |
|---|---|---|---|---|---|
| CN | 113071788 | A | * | 7/2021 | ............. B65D 25/10 |
| CN | 117899643 | A | * | 4/2024 | ............... F28D 1/04 |
| CN | 119163886 | A | * | 12/2024 | ................ F17C 1/00 |
| CN | 120991216 | A | * | 11/2025 | ............ F17C 13/026 |
| CN | 224216383 | U | * | 5/2026 | |
| KR | 20170072382 | A | * | 6/2017 | ............. B65D 90/12 |
| KR | 20190044311 | A | * | 4/2019 | ......... B63B 17/0027 |

OTHER PUBLICATIONS

"LPG Sampling," MECHATEST, https://www.mechatest.com/hydrocarbons-sampling-applications/lpg-sampling/, accessed Aug. 16, 2024, 5 pages.

* cited by examiner

PROTECTIVE CASE FOR GAS SAMPLING CYLINDER

FIELD OF THE DISCLOSURE

The present disclosure relates generally to sampling gas from gas wells and, more particularly, to cases utilized to protect gas cylinders utilized when sampling gases.

BACKGROUND OF THE DISCLOSURE

When sampling gas from gas wells, cylinders are utilized to capture gas and store gas from a gas source. However, when conducting the sampling on-site, the cylinders are often placed on the ground and generally not secured, such that the cylinders may move or fall during sampling, which could result in the cylinders and/or its components (e.g., valves) being damaged. Cases exist that protect the cylinders, for example, during transport, but existing cases are not designed to be utilized during sampling.

Accordingly, a need exists for a protective case for gas sampling cylinders that may be utilized to secure and protect gas-sampling cylinders during transport and sampling.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a protective case for a gas sampling cylinder having opposing first and second ends, the protective case including a body extending along an axis and having opposing first and second open ends, the body comprising a base portion and a lid portion pivotably attached to the base portion, a first end cap removably attached to the first open end, wherein the first end of the gas sampling cylinder extends through the first open end and is accessible upon removal of the first end cap, a second end cap removably attached to the second open end, wherein the second end of the gas sampling cylinder extends through the second open end and is accessible upon removal of the second end cap, and an extendable and retractable stand connected to the base portion and being transitionable between a retracted configuration and an extended configuration.

In another embodiment, a protective case for a gas sampling cylinder, the gas sampling cylinder having opposing first and second ends, the protective case including a body extending along an axis and having opposing first and second open ends and comprising a base portion and a lid portion pivotably attached to the base portion and extending between the opposing first and second open ends, a first end cap removably attached to the first open end, wherein the first end of the gas sampling cylinder extends through the first open end and is accessible upon removal of the first end cap, a second end cap removably attached to the second open end, wherein the second end of the gas sampling cylinder extends through the second open end and is accessible upon removal of the second end cap, a first frame and a second frame provided on the base portion, a first set of legs and a second set of legs connected to the base portion, the first set of legs and a second set of legs each being pivotably attached to the base portion such that they are rotatable between a retracted configuration and an extended configuration, the first set of legs being mounted within the first frame and the second set of legs being mounted within the second frame, a port provided on the body and configured to be fluidly coupled to a vacuum source to evacuate air from an interior compartment of the body when the lid portion is sealed on the base portion and when the first and second end caps are secured to the first and second open ends, and a pressure release button provided on the body.

In a further embodiment, a method of sampling a gas including arranging a protective case housing a gas sampling cylinder adjacent a gas sampling line extending from a gas source. The protective case includes a body extending along an axis and having opposing first and second open ends, and a base portion and a lid portion pivotably attached to the base portion and extending between the opposing first and second open ends, first and second end caps removably attached to the first and second open ends, respectively, and an extendable and retractable stand connected to the base portion and being transitionable between a retracted configuration and an extended configuration. The method also includes removing the first end cap from the body and thereby exposing a valve operatively coupled to the gas sampling cylinder, moving the extendable and retractable stand into the extended configuration to thereby elevate the body, fluidly coupling the gas sampling cylinder to the sampling line at the valve, extracting a gas sample from the gas source via the sampling line and receiving the gas sample within the gas sampling cylinder, disconnecting the gas sampling cylinder from the sampling line, and securing the first end cap to the body at the first open end and thereby sealing the gas sampling cylinder within the protective case.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
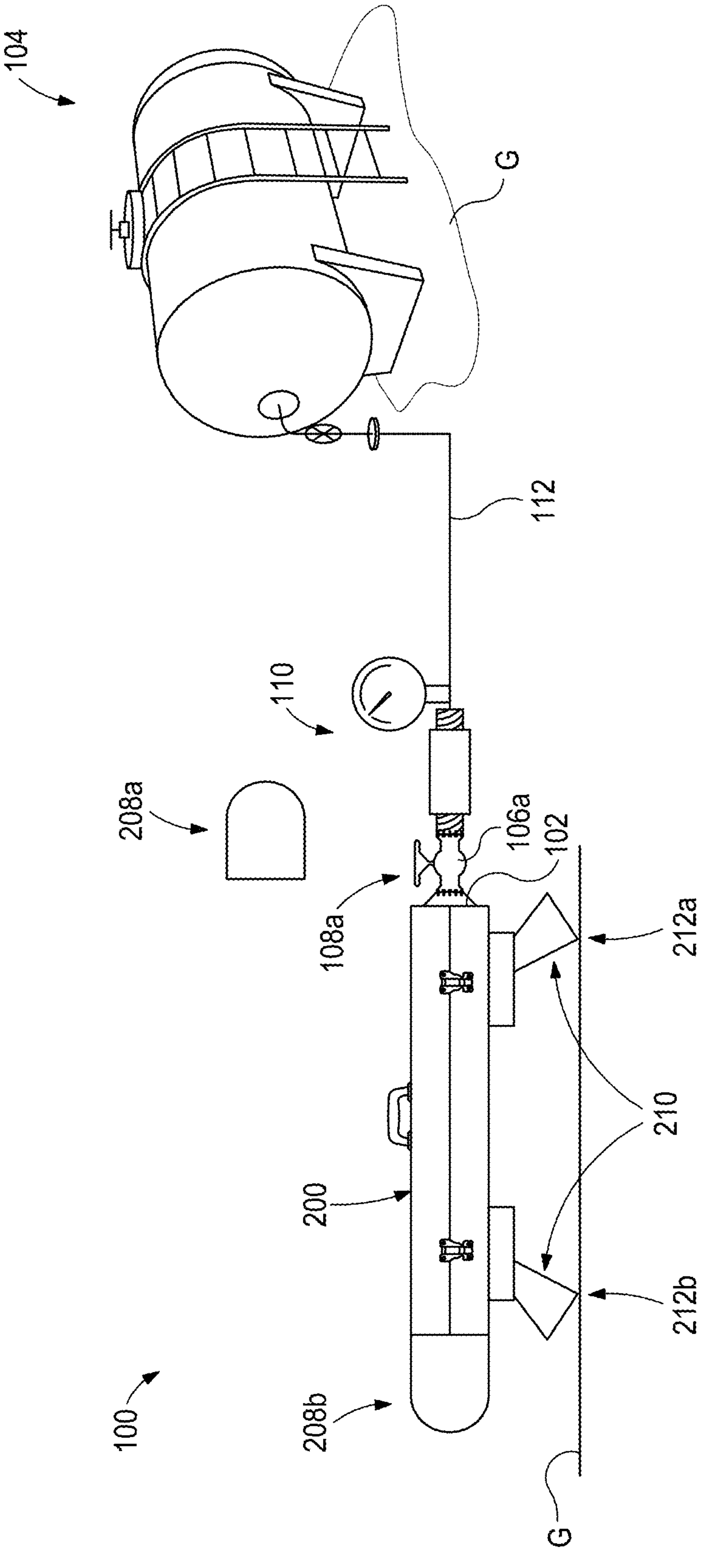
FIG. 1 schematic view of a gas sampling process utilizing a protective case, according to one or more embodiments of the present disclosure.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to on-site sampling at gas wells and, more particularly, to cases utilized to protect gas-sampling cylinders. The embodiments disclosed herein include a case having removable end caps and an extendible and retractable stand. The extendible and retractable stand may comprise a pair of legs that assist with standing and positioning the case during use in the field and/or during transport or storage. The case may include a valve utilized for drawing a vacuum within the an interior of the case, and the case may further include a pressure equalization button utilizable for equalizing pressure differences between the interior of the case and an exterior of the case.

FIG. 1 schematically depicts an example gas sampling process or system utilizing a protective case 100, according to one or more embodiments of the present disclosure. The protective case 100 (hereinafter, the case 100) is sized to be able to house a gas sampling cylinder 102 that is connectable to a gas source 104. The gas sampling cylinder 102 (hereinafter, the cylinder 102) includes a first valve 106*a* at a first end 108*a* thereof. In some embodiments, as illustrated, the first valve 106*a* may be connected to the gas source 104 via a regulator 110 and a gas sampling line 112.

The cylinder 102 also includes a second end 108*b* (occluded in FIG. 1) opposite the first end 108*a*, and the second end 108*b* may similarly include a second valve 106*b* (occluded in FIG. 1). While the second end 108*b* and the second valve 106*b* are obscured from view in FIG. 1, the second end 108*b* and the second valve 106*b* are visible in FIG. 2, which is discussed below.

In the illustrated embodiment, the gas source 104 is a gas tank that may be provided at the well site. In other embodiments, however, the gas source 104 may be provided at a processing facility. For example, gas to be sampled may be stored in large gas tanks after being separated or purified from gas lines. In other embodiments, gas samples may be collected in the field from a wellhead, such that the gas source 104 embodies a sampling point at the wellhead.

Figure 2:
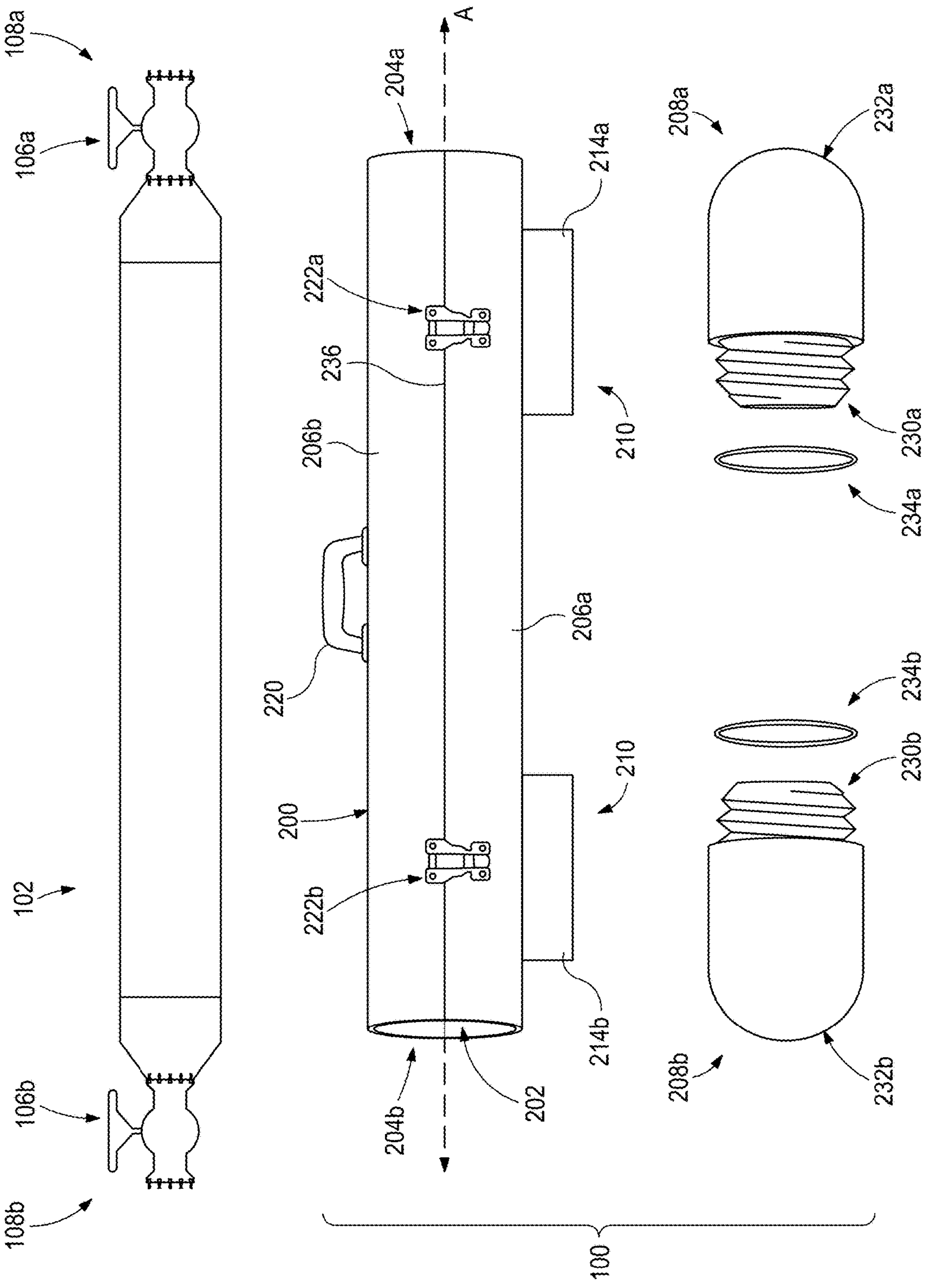
FIG. 2 is a schematic front view of the protective case of FIG. 1 when unassembled and with a gas-sampling cylinder having been removed therefrom.
Figure 3:
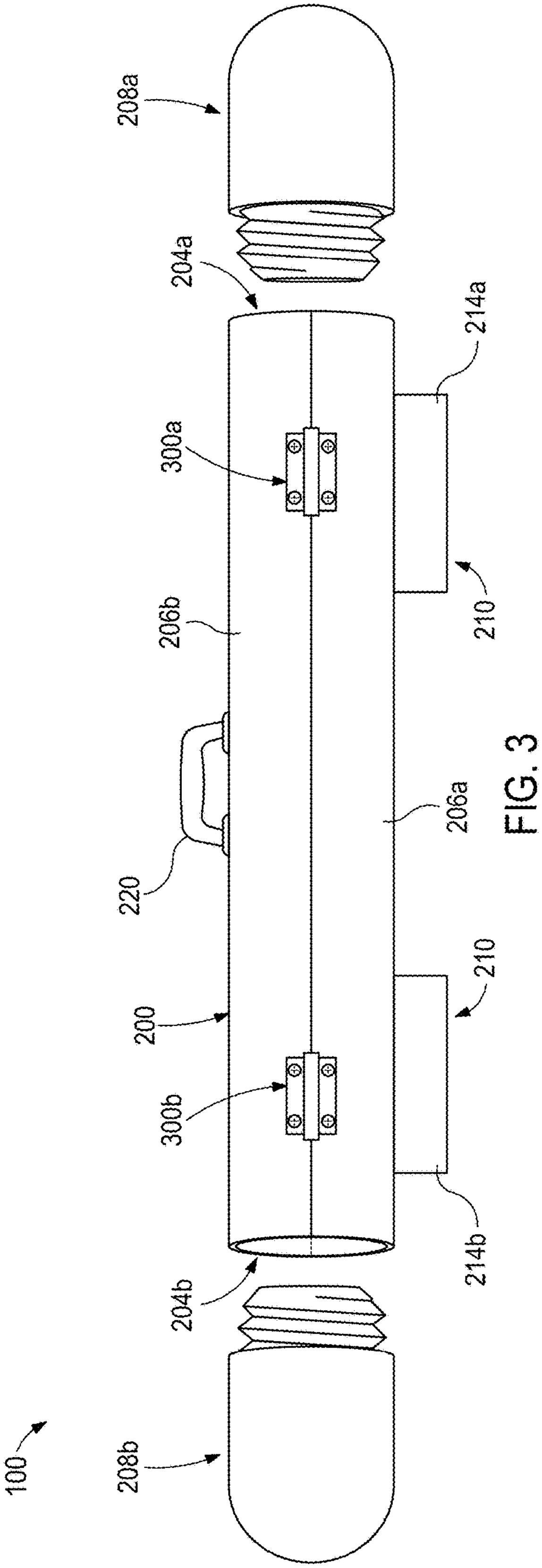
FIG. 3 is a schematic rear view of the protective case of FIG. 1 without the gas-sampling cylinder.

FIG. 2 is an exploded view of the case 100 and the cylinder 102 of FIG. 1, and FIG. 3 is a partially exploded view of the case 100 without the cylinder 102. In particular, FIG. 2 depicts a first or "front" view of the case 100, and FIG. 3 depicts a second or "rear" view of the case 100, where the first and second views are on opposite sides of the case 100. As illustrated, the case 100 includes a body 200 that extends along an axis A. The body 200 defines an interior compartment 202 that is sized and shaped to receive and house the cylinder 102. In embodiments, the case 100 may include padding (obscured from view) arranged in the interior compartment 202 of the body 200. The padding helps protect the cylinder 102 when secured in the case 100 from impact and vibration. The padding can include, for example, rubber, foam, a potting material, or any combination thereof. In embodiments, the padding is a combination of rubber and foam layers.

The body 200 includes a first open end 204*a* and a second open end 204*b*, wherein the second open end 204*b* is formed in the body 200 at a location along the axis A that is opposite the first open end 204*a*. The interior compartment 202 of the body 200 may be accessible via either the first or second open ends 204*a,b*. In the illustrated embodiment, the body 200 comprises a two-part housing that includes a base portion 206*a* and a lid portion 206*b*, with the base portion 206*a* and the lid portion 206*b* cooperating in a clamshell arrangement to define the interior compartment 202. In some embodiments, as illustrated, the lid portion 206*b* may be pivotably attached to the base portion 206*a* such that the lid portion 206*b* may rotate (pivot) relative to the base portion 206*a* between an open position, where the interior compartment 202 is exposed and open to the ambient environment, and a closed position. In embodiments, the lid portion 206*b* is pivotably attached to the base portion 206*a* via one or more hinges and, in the illustrated embodiment, the lid portion 206*b* is pivotably attached to the base portion 206*a* via a pair of hinges 300*a*, 300*b* as shown in FIG. 3.

In other embodiments, the base portion 206*a* and the lid portion 206*b* may be differently attached. For example, grooves may be formed in the base portion 206*a* and corresponding grooves may be formed in the lid portion 206*b* such that the lid portion 206*b* is slidably attached to the base portion 206*a*. In such embodiments, the lid portion 206*b* is slidable on the base portion 206*a* into a closed position, wherein the lid portion 206*b* may be slid away from the closed position and/or off of the base portion 206*a*.

The case 100 further includes a first end cap 208*a* and a second end cap 208*b*. The first end cap 208*a* is removably attached to the first open end 204*a* and the second end cap 208*b* is removably attached to the second open end 204*b*. FIG. 2 depicts the case 100 when the first end cap 208*a* and the second end cap 208*b* are each removed from the base 200, such that the first open end 204*a* and the second open end 204*b* are exposed and visible. In contrast, FIG. 1 depicts the case 100 with the second end cap 208*b* installed on the case 100, such that the second open end 204*b* is occluded and inaccessible, and with the first end cap 208*a* removed from the case 100. In embodiments, the first end cap 208*a* is provided over the first open end 204*a*, such that an interior circumferential surface of the first end cap 208*a* abuts an outer circumferential surface of the body 200 at the first open end 204*a*; whereas, in other embodiments, the first end cap 208*a* is provided within the first open end 204*a*, such that an outer circumferential surface of the first end cap 208*a* abuts an inner circumferential surface of the body 200 at the first open end 204*a*. The second end cap 208*b* may be provided over or provided within the second open end 204*b* in a similar manner as described with reference to the first end cap 208*a*. In embodiments, both the first end cap 208*a* and the second end cap 208*b* are provided over the body 200 as described above, or both are provided within the body 200 as described above, or one is provided within and the other is provided over.

When the cylinder 102 is arranged within the interior compartment 202, the first end 108*a* of the cylinder 102 may extend through (protrude out of) the first open end 204*a* of the body 200 such that the first end 108*a* and the first valve 106*a* are exposed. When the first end cap 208*a* is secured to the body 200, the first end cap 208*a* covers the first open end 204*a*. However, when the first end cap 208*a* is removed from the body 200, as shown in FIG. 1, the first end 108*a* and the first valve 106*a* of the cylinder 102 become exposed. Thus, the first end 108*a* and the first valve 106*a* of the cylinder 102 are accessible upon removal of the first end cap 208*a*. Similarly, when the second end cap 208*b* is secured to the body 200, the second end cap 208*b* covers the second open end 204*b*. However, when the second end cap 208*b* is removed from the body 200, the second end 108*b* and the second valve 106*b* of the cylinder 102 may be exposed, such that the second end 108*b* and the second valve 106*b* of the cylinder 102 are accessible upon removal of the second end cap 208*b*.

In some embodiments, the case 100 may further include an extendable and retractable stand 210. The extendable and retractable stand 210 is movable between a retracted configuration (state) and an extended configuration (state). FIG. 1 depicts the extendable and retractable stand 210 in the extended configuration, and FIG. 2 depicts the extendable and retractable stand 210 in the retracted configuration. When in the extended configuration, the extendable and retractable stand 210 is operable to elevate and support the body 200 of the case 100 a distance above the ground G surface, as shown in FIG. 1.

In the illustrated embodiment, the extendable and retractable stand 210 includes a first set of legs 212*a* and a second set of legs 212*b*. Also in the illustrated embodiment, the case 100 includes a pair of frames 214*a*, 214*b* provided on body 200 within which the extendable and retractable stand 210 are mounted and stowed when moved to the retracted configuration. In the illustrated embodiment, the pair of frames 214*a*, 214*b* are mounted on the base portion 206*a*, with the first set of legs 212*a* being mounted within a first of the pair of frames 214*a* and the second set of legs 212*b* being mounted within a second of the pair of frames 214*b*. In embodiments, each of the frames 214*a*, 214*b* is a structure (e.g., a rectangular shaped structure) that extends from the body 200 and that defines an interior space within which at least a portion of the extendable and retractable stand 210 may be stored (stowed) when in the retracted configuration in order to protect them from damage. In embodiments, the first set of legs 212*a* may be extended and/or retracted independently of the second set of legs 212*b*; whereas, in other embodiments, the first set of legs 212*a* and the second set of legs 212*b* are coupled or linked together such that they are extendable and retractable together in unison, wherein extending the first set of legs 212*a* will automatically open the second set of legs 212*b*, and vice versa. In embodiments, a first leg of the first set of legs 212*a* may be extended and/or retracted independently of a second leg of the first set of legs 212*a*, and/or a first leg of the second set of legs 212*b* may be extended and/or retracted independently of a second leg of the second set of legs 212*b*. In other embodiments, the first leg of the first set of legs 212*a* and the second leg of the first set of legs 212*a* are coupled or linked together such that they are extendable and retractable together in unison, wherein extending the first leg of the first set of legs 212*a* will automatically open the second leg of the first set of legs 212*a*, and vice versa; and/or the first leg of the second set of legs 212*b* and the second leg of the second set of legs 212*b* are coupled or linked together such that they are extendable and retractable together in unison, wherein extending the first leg of the second set of legs 212*b* will automatically open the second leg of the second set of legs 212*b*, and vice versa.

In the illustrated embodiment, the first set of legs 212*a* and the second set of legs 212*b* are each pivotably attached to the body 200 such that they are rotatable between the retracted and extended configurations. More specifically, the first and second sets of legs 212*a,b* may each pivotably attached to the base portion 206*a* of the body 200, for example, via a hinge associated with each of the first set of legs 212*a* and the second set of legs 212*b* that allows them to rotate between the retracted and extended configurations; however, they may be pivotably attached elsewhere about the body 200. In embodiments, the first set of legs 212*a* and the second set of legs 212*b* each include a spring that naturally biases them in either the extended configuration or the retracted configuration. In other embodiments, other mechanisms may be utilized to allow movement of the first set of legs 212*a* and the second set of legs 212*b* between the retracted configuration and the extended configuration, for example, the first set of legs 212*a* and the second set of legs 212*b* may each be telescoping legs that extend or retract via a telescoping mechanism, and such telescoping mechanism may be spring loaded to assist in extension and/or retraction thereof.

In embodiments, the body 200 (including the base portion 206*a*, the lid portion 206*b*, and the frames 214*a*, 214*b* may be made from a plastic, such as Polyethylene (PE). In other embodiments, they are made from other materials, such as carbon fiber. In some embodiments, the end caps 208*a*, 208*b* may be made from the same material as the body 200, such as PE or carbon fiber. In embodiments, the first set of legs 212*a* and the second set of legs 212*b* are made from a metal, such as aluminum, titanium, or stainless steel.

In embodiments, the case 100 may include a handle 220. The handle 220 may be provided on the body 200 such that a user may hold and carry the case 100. In the illustrated embodiment, the handle 220 is provided on the lid portion 206*b* of the body 200. In some embodiments, the handle 220 is connected to the body 200 via one or more hinges or pins that allow the handle 220 to rotate (pivot) relative to the body 200. In embodiments, the ends of the handle 220 are movably coupled to the body 200 via a link(s) of chain such that the handle 220 may rest on the body 200 when not being carried.

In embodiments, the case 100 includes a latch mechanism operable to selectively lock the body 200 and thereby control access to the interior compartment 202. In the illustrated embodiment, the latch mechanism includes a pair of latch mechanisms 222*a*, 222*b* that are utilizable to selectively lock the lid portion 206*b* to the base portion 206*a*. However, other mechanisms may be utilized to selectively secure the lid portion 206*b* to the base portion 206*a* of the body 200. For example, a zipper mechanism or Velcro may be utilized to selectively secure the lid portion 206*b* to the base portion 206*a* of the body 200.

In the illustrated embodiment, the first end cap 208*a* and the second end cap 208*b* are each threadably connected to the body 200. As illustrated, the first end cap 208*a* includes a first threaded end 230*a* and the first open end 204*a* includes corresponding internal threads such that the first end cap 208*a* may be threaded into and out of engagement with the first open end 204*a* of the body 200. Similarly, the second end cap 208*b* includes a second threaded end 230*b* and the second open end 204*b* includes corresponding internal threads such that the second end cap 208*b* may be threaded into and out of engagement with the second open end 204*b* of the body 200. In other embodiments, first end cap 208*a* and the second end cap 208*b* may be differently attached to the body 200. For example, mechanical fasteners or magnets may be utilized to selectively and releasably attach the first end cap 208*a* and/or the second end cap 208*b* to the body 200. In embodiments, a press may be utilized to attach the first end cap 208*a* and/or the second end cap 208*b* to the body 200, which would thereby permit a diameter of the first end cap 208*a* and/or the second end cap 208*b* to be slightly larger than the corresponding diameter of the body 200 but pressed onto the body 200 despite such size difference, to thereby seal the case 100.[

In the illustrated embodiment, the first end cap 208*a* and the second end cap 208*b* also each include a bulb portion 232*a*, 232*b* connected to and extending from the threaded end 230*a*, 230*b* thereof. The bulb portion 232*a*, 232*b* of each end cap 208*a*, 208*b* defines an interior space that is sufficiently sized and dimensioned to receive the end 108*a*, 108*b* of the cylinder 102 associated therewith, including the valve 106*a*, 106*b* associated therewith. For example, FIG. 1 depicts the case 100 when the second end cap 208*b* is installed on the base 200, with the bulb portion 232*b* thereof being of sufficient size to thereby cover (and protect) the second valve 106*b* arranged at the second end 108*b* of the cylinder 102. The first end cap 208*a* and the second end cap 208*b* (and their associated bulb portions 232*a*, 232*b*) function to protect the portion of the cylinder 102 covered thereby. For example, the first end cap 208*a* and, more specifically, the bulb portion 232*a* thereof protects the first end 108*a* of the cylinder 102 and, more specifically, the bulb portion 232*a* protects the first valve 106*a* at the first end 108*a* of the cylinder 102. Similarly, the second end cap 208*b* protects the second end 108*b* of the cylinder 102 and the second valve 106*b* positioned at the second end 108*b*.

In some embodiments, the first end cap 208*a* and the second end cap 208*b* are sealed on the body 200 to inhibit moisture, debris and other contaminants from entering the interior compartment 202 of the body 200, and to also inhibit contents of the cylinder 102 from exiting (e.g., leaking out of) the interior compartment 202 of the body 200 when the case 100 is in the closed position, for example, in case of a leak. In the illustrated embodiment, the case 100 includes a first O-ring 234*a* arranged between the first end cap 208*a* and the first open end 204*a* of the body 200 and a second O-ring 234*b* arranged between the second end cap 208*b* and the second open end 204*b* of the body 200. Also, the body 200 may be sealed when in the closed position to inhibit materials from entering and exiting the interior compartment 202 when the body 200 is in the closed position, as mentioned above with respect to sealing of the first end cap 208*a* and the second end cap 208*b*. Thus, a seal may be formed between the lid portion 206*b* and the base portion 206*a* of the body 200 when in the closed position, to facilitate sealing of the body 200 and, in such embodiments, an O-ring 236 may be arranged between the base portion 206*a* and the lid portion 206*b* of the body 200.

The gases sampled in the field and to be stored in the cylinders 102 may be corrosive and/or flammable. Thus, to help inhibit leaks from the case 100 during transport of the cylinder 102 from the field to the lab and/or storage of the cylinder 102 in the lab, a vacuum may be created/generated within the interior compartment 202 of the case 100 (e.g., when the body 200 is in the closed position with the end caps 208*a*, 208*b* installed). Forming a vacuum within the interior compartment 202 will help eliminate any leakage during transport and storage.

Figure 4:
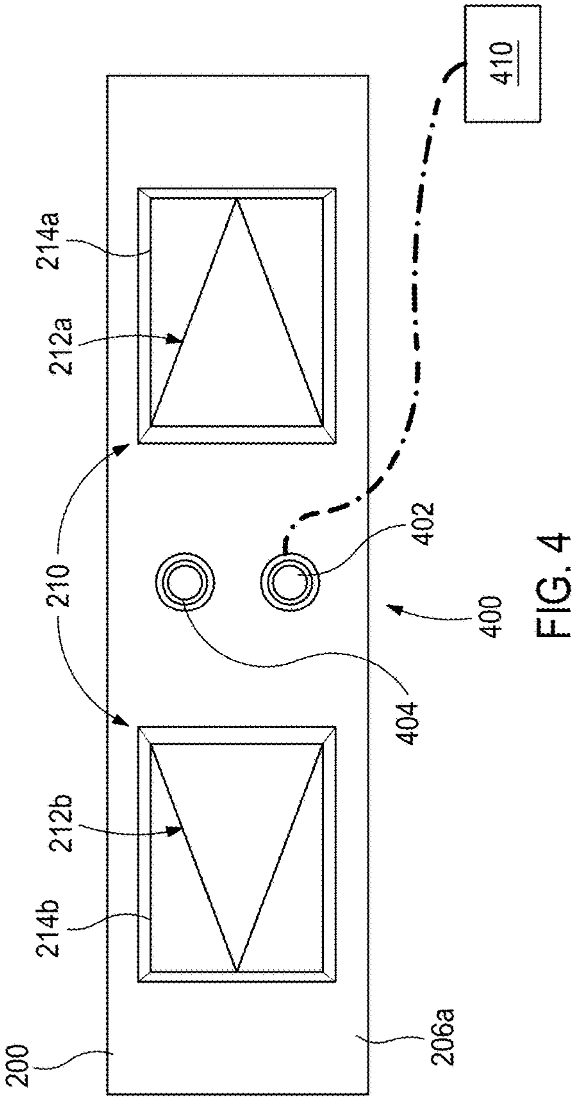
FIG. 4 depicts a portion of the protective case, according to one or more embodiments of the present disclosure.

FIG. 4 depicts a portion 400 of the case 100 configured for vacuuming (or creating a vacuum within) the case 100, according to one or more embodiments. In the illustrated embodiment, the case 100 includes a port 402 provided on the body 200 that may be fluidly coupled to a vacuum source 410 for evacuating air from the interior compartment 202 of the body 200 when the lid portion 206*b* is sealed on the base portion 206*a* and when the first and second end caps 208*a*, 208*b* are secured to the first and second open ends 206*a*, 206*b*. In the illustrated embodiment, the port 402 is provided on the base portion 206*a*, but in other embodiments, the port 402 may be provided on the lid portion 206 or either of the first and second end caps 208*a*, 208*b*. In embodiments, the port 402 may be a valve that is selectively connectable to the vacuum source 410 in order generate the vacuum within the interior compartment 202.

Also in the illustrated embodiment, the case 100 includes a pressure release button 404 provided on the body 200. The pressure release button 404 is operable to release the vacuum (or equalize pressure within the interior compartment 202 with the ambient environment) upon pressing of the pressure release button 404. Here, the pressure release button 404 is provided on the base portion 206*a*, but in other embodiments, the pressure release button 404 may be provided on other portions of the body 200, such as the lid portion 206 or either of the first and second end caps 208*a*, 208*b*. In embodiments, the pressure release button 404 is a spring loaded button that helps equalize the pressure differences inside and outside the case 100 when pressed, as pressing the button would allow the influx of ambient air into the interior of the case 100. In embodiments, desiccants may be incorporated into the pressure release button 404 to help limit or inhibit moisture from entering the interior compartment 202 of the case 100 when the pressure release button 404 is pressed. In the illustrated embodiment, the port 402 and the pressure release button 404 are provided on a bottom side of the body 200 (on the base portion 206*a*) in between the extendable and retractable stand 210, such that the extendable and retractable stand 210 (and in between the first set of legs 212*a* and the second set of legs 212*b* contained therein) protect the port 402 and the pressure release button 404 from accidental impact that may result in damage thereto.

The case 100 may be utilized when sampling gas from the gas source 104. Thus, a method of sampling a gas from the gas source 104 may include arranging the case 100 housing the cylinder 102 adjacent the sampling line 112 extending from the gas source 104. The method may also include removing the first end cap 208*a* (and/or the second end cap 208*b*) from the body 200 and thereby exposing the first valve 106*a* operatively coupled to the cylinder 102 (and/or thereby exposing the second valve 106*b* also operatively coupled to the cylinder 102 at the opposite end). In addition, the method may include fluidly coupling the cylinder 102 to the sampling line 112 at the first valve 106*a* (or the second valve 106*b*), extracting a gas sample from the gas source 104 through the sampling line 112, and receiving the gas sample within the cylinder 102. The method includes elevating the case 100 by extending (or moving) the extendable and retractable stand 210 into the extended configuration to thereby elevate and support the body 200 of the case 100 a distance above the ground G surface.

In addition, the method may then include disconnecting the cylinder 102 from the sampling line 112 and securing the first end cap 208*a* (or the second end cap 208*b*) to the body 200 of the case 100 at the first open end 204*a* (or the second open end 204*b*) and thereby sealing the cylinder 102 within the interior compartment 202 of the case 100. Further, the method may include fluidly coupling the body 200 of the case 100 to the vacuum source 410 at the port 402 provided on the body 200 and evacuating air from the interior compartment 202 of the body 200 and thereby generating a vacuum within the interior compartment 202. Moreover, the method may include releasing the vacuum from within the interior compartment 202 by actuating the pressure release button 404 provided on the body 200.

Embodiments disclosed herein include:

A. A protective case for a gas sampling cylinder having opposing first and second ends, the protective case including a body extending along an axis and having opposing first and second open ends, the body comprising a base portion and a lid portion pivotably attached to the base portion, a first end cap removably attached to the first open end, wherein the first end of the gas sampling cylinder extends through the first open end and is accessible upon removal of the first end cap, a second end cap removably attached to the second open end, wherein the second end of the gas sampling cylinder extends through the second open end and is accessible upon removal of the second end cap, and an extendable and retractable stand connected to the base portion and being transitionable between a retracted configuration and an extended configuration.

B. A protective case for a gas sampling cylinder, the gas sampling cylinder having opposing first and second ends, the protective case including a body extending along an axis and having opposing first and second open ends and comprising a base portion and a lid portion pivotably attached to the base portion and extending between the opposing first and second open ends, a first end cap removably attached to the first open end, wherein the first end of the gas sampling cylinder extends through the first open end and is accessible upon removal of the first end cap, a second end cap removably attached to the second open end, wherein the second end of the gas sampling cylinder extends through the second open end and is accessible upon removal of the second end cap, a first frame and a second frame provided on the base portion, a first set of legs and a second set of legs connected to the base portion, the first set of legs and a second set of legs each being pivotably attached to the base portion such that they are rotatable between a retracted configuration and an extended configuration, the first set of legs being mounted within the first frame and the second set of legs being mounted within the second frame, a port provided on the body and configured to be fluidly coupled to a vacuum source to evacuate air from an interior compartment of the body when the lid portion is sealed on the base portion and when the first and second end caps are secured to the first and second open ends, and a pressure release button provided on the body.

C. A method of sampling a gas including arranging a protective case housing a gas sampling cylinder adjacent a gas sampling line extending from a gas source. The protective case includes a body extending along an axis and having opposing first and second open ends, and a base portion and a lid portion pivotably attached to the base portion and extending between the opposing first and second open ends, first and second end caps removably attached to the first and second open ends, respectively, and an extendable and retractable stand connected to the base portion and being transitionable between a retracted configuration and an extended configuration. The method also includes removing the first end cap from the body and thereby exposing a valve operatively coupled to the gas sampling cylinder, moving the extendable and retractable stand into the extended configuration to thereby elevate the body, fluidly coupling the gas sampling cylinder to the sampling line at the valve, extracting a gas sample from the gas source via the sampling line and receiving the gas sample within the gas sampling cylinder, disconnecting the gas sampling cylinder from the sampling line, and securing the first end cap to the body at the first open end and thereby sealing the gas sampling cylinder within the protective case.

Each of embodiments A through C may have one or more of the following additional elements in any combination: Element 1: wherein the extendable and retractable stand comprises a first set of legs and a second set of legs. Element 2: further comprising a pair of frames provided on the base portion, the first set of legs being mounted within a first of the pair of frames and the second set of legs being mounted within a second of the pair of frames. Element 3: wherein the first set of legs and the second set of legs are each pivotably attached to the base portion such that they are pivotable between the retracted and extended configurations. Element 4: wherein the first and second sets of legs each include a spring that biases the first and second sets of legs toward either the extended or retracted configuration. Element 5: wherein the first set of legs and the second set of legs comprise metal. Element 6: further comprising a port provided on the body and configured to be fluidly coupled to a vacuum source to evacuate air from an interior compartment of the body when the lid portion is sealed on the base portion and when the first and second end caps are secured to the first and second open ends. Element 7: further comprising a pressure release button provided on the body. Element 8: wherein the port and the pressure release button are provided on the base portion of the body. Element 9: further comprising a handle pivotably mounted to the lid portion of the body, wherein the handle is retractable and extendible. Element 10: further comprising one or more hinges that pivotably couple the lid portion to the base portion. Element 11: further comprising a latch mechanism that selectively locks the lid portion to the base portion. Element 12: wherein the body, the first end cap, and the second end cap comprise polyethylene. Element 13: wherein the first end cap is threadably connected to the first open end and the second end cap is threadably connected to the second open end. Element 14: further comprising a first O-ring arranged between the first end cap and the first open end, a second O-ring between the second end cap and the second open end, and a third O-ring between the base portion and the lid portion of the body. Element 15: further comprising padding provided inside the body to receive the gas sampling cylinder.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A protective case for a gas sampling cylinder having opposing first and second ends, the protective case comprising:

a body extending along an axis and having opposing first and second open ends, the body comprising a base portion and a lid portion pivotably attached to the base portion;

a first end cap removably attached to the first open end, wherein the first end of the gas sampling cylinder extends through the first open end and is accessible upon removal of the first end cap;

a second end cap removably attached to the second open end, wherein the second end of the gas sampling cylinder extends through the second open end and is accessible upon removal of the second end cap; and an extendable and retractable stand connected to the base portion and being transitionable between a retracted configuration and an extended configuration.

2. The protective case of claim 1, wherein the extendable and retractable stand comprises a first set of legs and a second set of legs.

3. The protective case of claim 2, further comprising a pair of frames provided on the base portion, the first set of legs being mounted within a first of the pair of frames and the second set of legs being mounted within a second of the pair of frames.

4. The protective case of claim 2, wherein the first set of legs and the second set of legs are each pivotably attached to the base portion such that they are pivotable between the retracted and extended configurations.

5. The protective case of claim 2, wherein the first and second sets of legs each include a spring that biases the first and second sets of legs toward either the extended or retracted configuration.

6. The protective case of claim 2, wherein the first set of legs and the second set of legs comprise metal.

7. The protective case of claim 1, further comprising a port provided on the body and configured to be fluidly coupled to a vacuum source to evacuate air from an interior compartment of the body when the lid portion is sealed on the base portion and when the first and second end caps are secured to the first and second open ends.

8. The protective case of claim 7, further comprising a pressure release button provided on the body.

9. The protective case of claim 8, wherein the port and the pressure release button are provided on the base portion of the body.

10. The protective case of claim 1, further comprising a handle pivotably mounted to the lid portion of the body, wherein the handle is retractable and extendible.

11. The protective case of claim 1, further comprising one or more hinges that pivotably couple the lid portion to the base portion.

12. The protective case of claim 1, further comprising a latch mechanism that selectively locks the lid portion to the base portion.

13. The protective case of claim 1, wherein the body, the first end cap, and the second end cap comprise polyethylene.

14. The protective case of claim 1, wherein the first end cap is threadably connected to the first open end and the second end cap is threadably connected to the second open end.

15. The protective case of claim 1, further comprising a first O-ring arranged between the first end cap and the first open end, a second O-ring between the second end cap and the second open end, and a third O-ring between the base portion and the lid portion of the body.

16. The protective case of claim 1, further comprising padding provided inside the body to receive the gas sampling cylinder.

17. A protective case for a gas sampling cylinder, the gas sampling cylinder having opposing first and second ends, the protective case comprising:

a body extending along an axis and having opposing first and second open ends and comprising a base portion and a lid portion pivotably attached to the base portion and extending between the opposing first and second open ends;

a first end cap removably attached to the first open end, wherein the first end of the gas sampling cylinder extends through the first open end and is accessible upon removal of the first end cap;

a second end cap removably attached to the second open end, wherein the second end of the gas sampling cylinder extends through the second open end and is accessible upon removal of the second end cap;

a first frame and a second frame provided on the base portion;

a first set of legs and a second set of legs connected to the base portion, the first set of legs and a second set of legs each being pivotably attached to the base portion such that they are rotatable between a retracted configuration and an extended configuration, the first set of legs being mounted within the first frame and the second set of legs being mounted within the second frame;

a port provided on the body and configured to be fluidly coupled to a vacuum source to evacuate air from an interior compartment of the body when the lid portion is sealed on the base portion and when the first and second end caps are secured to the first and second open ends; and a pressure release button provided on the body.

18. A method of sampling a gas, comprising:

arranging a protective case housing a gas sampling cylinder adjacent a gas sampling line extending from a gas source, the protective case including:

a body extending along an axis and having opposing first and second open ends, and a base portion and a lid portion pivotably attached to the base portion and extending between the opposing first and second open ends;

first and second end caps removably attached to the first and second open ends, respectively; and an extendable and retractable stand connected to the base portion and being transitionable between a retracted configuration and an extended configuration;

removing the first end cap from the body and thereby exposing a valve operatively coupled to the gas sampling cylinder;

moving the extendable and retractable stand into the extended configuration to thereby elevate the body;

fluidly coupling the gas sampling cylinder to the sampling line at the valve;

extracting a gas sample from the gas source via the sampling line and receiving the gas sample within the gas sampling cylinder;

disconnecting the gas sampling cylinder from the sampling line; and securing the first end cap to the body at the first open end and thereby sealing the gas sampling cylinder within the protective case.

19. The method of claim 18, further comprising:

fluidly coupling the body to a vacuum source at a port provided on the body; and evacuating air from an interior compartment of the body and thereby generating a vacuum within the interior compartment.

20. The method of claim 19, further comprising releasing the vacuum from within the interior compartment by actuating a pressure release button provided on the body.

* * * * *